Feb. 24, 1953 P. KOLLSMAN 2,629,148
DEVICE FOR STERILIZING HOLLOW THERMOPLASTIC
ARTICLES BY HEAT
Filed April 28, 1948

INVENTOR.
PAUL KOLLSMAN
BY
Howard G. Russell
his ATTORNEY

Patented Feb. 24, 1953

2,629,148

UNITED STATES PATENT OFFICE 2,629,148

DEVICE FOR STERILIZING HOLLOW THERMOPLASTIC ARTICLES BY HEAT

Paul Kollsman, New York, N. Y.

Application April 28, 1948, Serial No. 23,825

6 Claims. (Cl. 21—92)

This invention relates to the art of sterilizing articles by heat and has particular application to the sterilizing of articles made of thermoplastic material which ordinarily do not lend themselves to treatment at ordinary sterilizing temperatures because of their inherent properties to soften and deform.

The bodies of hypodermic syringes, ampules, and receptacles for liquid or dry pharmaceutical materials are advantageously made from thermoplastic materials because of the ease with which such materials can be formed to precise dimensions within relatively close tolerances.

It is generally necessary to sterilize such articles after machining, molding, pressing, assembling or otherwise handling them. Sterilization by heat, which is generally accepted as one of the most efficient methods of sterilizing, leads to difficulties if applied to thermoplastics materials because of the inability of the material to withstand sterilizing temperatures for the necessary period of time without deformation due to the fact that material assumes a plastic or semi-plastic state if heated.

The difficulty of sterilizing thermoplastic articles has been a major obstacle to a more extensive use of thermoplastic materials for the aforementioned purposes in spite of the many advantages which thermoplastic materials offer in other respects over more conventional materials such as metal and glass.

The invention provides a device for use in heat sterilizing hollow articles, particularly hypodermic syrings, made from thermoplastic materials. According to the invention, the article to be sterilized is confined in such a way that in spite of passing through a plastic or semiplastic state during the sterilization the article emerges with the precise dimensions which it is intended to have. The invention makes it possible, for example, to sterilize parts of hypodermic syringes made from a thermoplastic material which ordinarily deforms at temperatures at about 85 degrees centigrade by subjecting it to a sterilizing temperature of 145 degrees centigrade for a considerable period of time without sacrifice or impairment of the accurate dimensions of the hollow parts.

The various objects, features and advantages of the invention will appear more fully from the detailed description which follows accompanied by drawings showing for the purpose of illustration preferred embodiments of the invention. The invention also consists in certain new and original features of construction and combination of elements hereinafter set forth and claimed.

Although the characteristic features of the invention which are believed to be novel will be particularly pointed out in the claims appended hereto, the invention itself, its objects and advantages and the manner in which it may be carried out may be better understood by referring to the following description taken in connection with the accompanying drawings forming a part of it in which:

Figure 1:
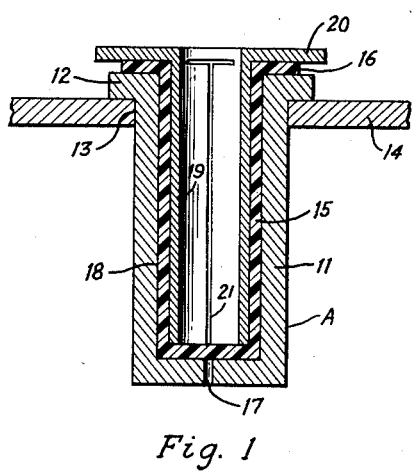
Figure 1 is a sectional side view of a constraining device for use in heat sterilizing hollow syringe elements.

In the following description and in the claims, various details will be identified by specific names for convenience. The names, howover, are intended to be as generic in their application as the art will permit. Corresponding reference characters refer to corresponding parts in the several figures of the drawings.

In the drawings accompanying, and forming part of, this specification, certain specific disclosure of the invention is made for the purpose of explanation of broader aspects of the invention, but it is understood that the details may be modified in various respects without departure from the principles of the invention, and that the invention may be applied to other structures than the ones shown.

The device shown in Figure 1 comprises a confining outer member 11 having a flange 12 resting in an aperture 13 of a supporting plate 14. A hollow cylindrical element 15 of thermoplastic material is inserted into the outer member 11. The illustrated element 15 is the plunger of a hypodermic syringe and includes a flange portion 16 for manipulation of the plunger. The flange portion 16 rests on the flange 12 of the outer member 11.

The outer member 11 has a vent passage 17 therethrough to facilitate insertion and removal of the hollow element 15 without trapping air in the outer confining member. The interior surface 18 of the outer confining member constitutes a female contacting surface for support of the outer surface of the syringe plunger 16. The surface 18 is machined with great accuracy since it determines the outside dimensions which the hollow element will have after the sterilizing treatment. The shape and dimensions of the surface 18 correspond to those of the outside surface of the hollow element 15, with allowance for small changes which occur in the dimensions of both the confining member 11 and of the hollow element 15, by reason of thermal expansion and contraction. Normally, the coefficient of thermal expansion of the thermoplastic element is greater than that of the metallic confining member so that at room temperature the hollow syringe elements 15 fits loosely into the confining outer member 11.

A confining inner member 19 having a flange 20 overlying the flange portion 16 of the hollow element 15 supports the inside wall of the hollow element 15. Preferably the inner confining member 19 is slotted longitudinally as shown at 21 in order to permit its diameter to increase and decrease slightly in order to compensate for changes in the inner diameter of the thermoplastic element 15 during the heat treatment. The slot or slots 21 are sufficiently narrow to prevent entry of thermoplastic material into them during the heating of the device and thermoplastic element to sterilizing temperatures. The property of the inner confining member to expand and contract resiliently facilitates insertion into, and withdrawal from, the thermoplastic elements 15.

The device illustrated in Figure 1 may be used as follows:

The hollow element 15 of thermoplastic material which is intended to be sterilized by heat is first inserted into the outer constraining member 11 into which it fits with a slight amount of play. The inner supporting member 19 is then inserted into the element 15 which is facilitated by the ability of the inner member resiliently to contract and expand.

The device is then exposed to sterilizing temperatures for a sufficient period of time. Due to the heating the thermoplastic element assumes a plastic state which would cause it to deform, warp or collapse if it were not for the constraining support of the inner and the outer constraining members. During the heating the element 15 also expand at a rate greater than the rate of expansion of its confining members. This causes the outer wall of the thermoplastic element to contact the inner surface 18 of the confining member 11 with a certain force sufficient to correct minor inaccuracies in the shape which the element 15 may have had prior to the sterilizing treatment.

After a sufficient period of time has elapsed, the device is permitted to cool. This causes the thermoplastic element to contract slightly and at a rate greater than the contraction of the bore in the outer member 11, without however, losing its accurate shape. The sterile element may then be removed from the outer member and the inner confining member is also withdrawn.

Figure 2:
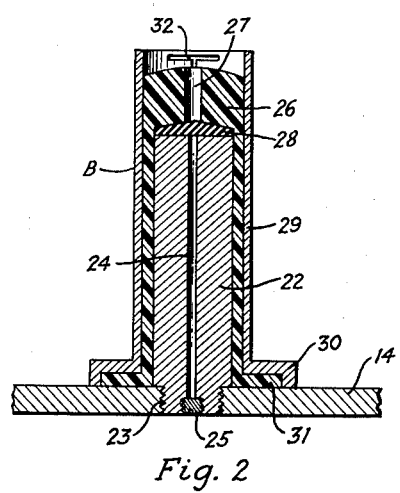
Figure 2 is a sectional side view, in section of a modified form of device.

The device shown in Figure 2 is particularly designed for sterilizing barrels of hypodermic syringes. The device comprises an inner confining member or post 22 which is threaded into the supporting plate 14 at 23. The post 22 has an air passage 24 therethrough through which compressed air may be applied for ejecting the sterilized barrel as hereinafter set forth. The air passage terminates at a threaded portion 25 of the post for connection of an air pressure line thereto.

The post 22 is adapted to support the hollow barrel 26 of a hypodermic syringe which is to be sterilized. The barrel 26 may be provided with a bore 27 for later insertion of a needle assembly. The bore 27 may be closed by a seal or plug so that air or other fluid pressure may be effectively applied to the barrel for the purpose of removing it from the post.

An outer confining member or sleeve 29 fits over the barrel and is preferably provided with a flange portion 30 to a cover a flange portion 31 of the barrel. One or several longitudinal slots 32 in the cylindrical portion of the sleeve 29 provide for sufficient expansion and contraction to permit convenient application of the sleeve to the barrel and its removal from the same.

The inner supporting post 22 and the outer confining sleeve 29 prevent distortion of the thermoplastic barrel during the period of heating required for sterilization. After the heat treatment, the thermoplastic barrel may be loosened or entirely be removed from the post by application of a charge of air or other suitable fluid under pressure. The pressure acts against the seal or plug 28 which closes the passage 27 and lifts the barrel off the post whereafter the outer sleeve may be removed from the barrel.

Figure 3:
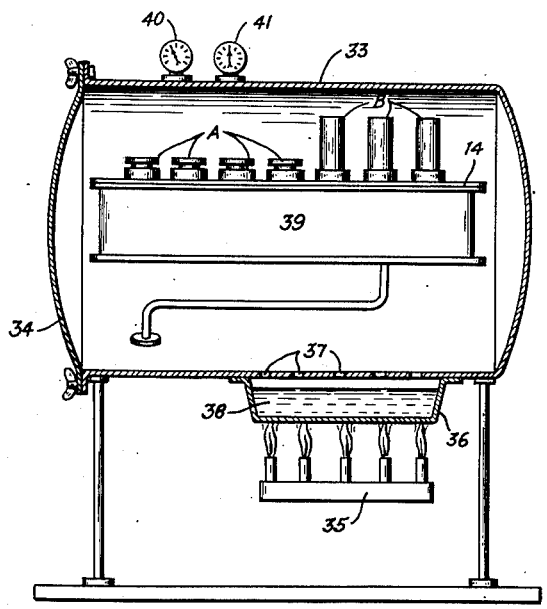
Figure 3 is a side view, partly in section, of an apparatus for heat sterilizing thermoplastic articles.

The sterilizing device illustrated in Figure 3 comprises autoclave 33 having a removable cover 34. The autoclave may be heated by a heating unit 35 associated with a chamber 36 communicating with the interior of the autoclave through passages 37. The chamber 36 contains a charge of water 38 or other suitable liquid which may be partially converted into steam in order to convey heat to the contents of the autoclave.

A tray 39 is shown comprising a supporting top surface plate 14 in which the several units A and B are mounted corresponding to the units shown in Figs. 1 and 2. The autoclave is equipped with the usual pressure and temperature gauges 40 and 41 so that the pressure and temperature may be observed throughout the sterilizing process.

The invention thus provides a simple and efficient device for heat sterilizing hollow articles of thermoplastic material which, by reason of their heat deformability present problems in sterilizing.

Obviously, the present invention is not restricted to the specific embodiments herein shown and described, but may, with equal benefit, be applied or adapted to other forms of thermoplastic parts. Also the construction of the device may be modified without departing from the spirit and the essence of the present invention.

What is claimed is:

1. A device for use in sterilizing by heat hollow elements of syringes made from thermoplastic material of a character assuming a plastic state at sterilizing temperatures, the device comprising a confining inner core member, and a confining outer sleeve member, said members being of rigid shape retaining material, said core member having an external element contacting surface thereon, the sleeve member having an internal element contacting surface thereon, the external surface being of a smaller diameter than the internal surface, at least one of said surfaces being of cylindrical shape, the one member carrying the other surface having a lengthwisely slotted wall for yieldingly urging a syringe element confined between said members against the other member, the other member having a passage therethrough leading to the space between said two members.

2. A device for sterilizing by heat hollow elements of syringes made from thermoplastic material, of a character assuming a plastic state at sterilizing temperatures, the device comprising a confining inner core member, a confining outer sleeve member, said members being of rigid shape retaining material, said core member having an external element contacting surface thereon, the sleeve member having an internal element contacting surface thereon, the external surface being of a smaller diameter than the internal surface, at least one of the surfaces being of cylindrical shape, the member carrying the other surface having a lengthwisely slotted wall for yieldingly urging a syringe element confined between said members against the other member, the other member having a passage therethrough leading to the space between the two members; and means for applying heat to said two members.

3. A device for use in sterilizing by heat hollow elements of syringes made from a thermoplastic material of a character assuming a plastic state at sterilizing temperatures, the device comprising a confining inner core member, and a confining outer substantially cup-shaped sleeve member, said members being of rigid shape retaining material, said sleeve member having a cylindrical inner element contacting surface thereon, the core member being of metal and having a substantially cylindrical wall of an outside diameter smaller than the inside diameter of said cylindrical surface, said core member being slotted longitudinally in order to be resiliently compressible in a radial direction, the sleeve member having a passage through its bottom leading to the space between the two members.

4. A device for sterilizing by heat hollow elements of syringes made from a thermoplastic material of a character assuming a plastic state at sterilizing temperatures, the device comprising a confining inner core member, and a confining outer substantially cup-shaped sleeve member, said members being of rigid shape retaining material, said sleeve member having a cylindrical inner element contacting surface thereon, the core member being of metal and having a substantially cylindrical wall of an outside diameter smaller than the inside diameter of said cylindrical surface, said wall being slotted longitudinally in order to be resiliently compressible in a radial direction, the sleeve member having a passage through its bottom leading to the space between the two members; and means for applying heat to said two members.

5. A device for use in sterilizing by heat hollow elements of syringes made from a thermoplastic material of a character assuming a plastic state at sterilizing temperatures, the device comprising a confining inner core member, a plate upon which said core member is mounted, and a confining sleeve member, said members being of a rigid shape retaining material, said core member having a cylindrical outer element contacting surface thereon normal to said plate, the sleeve member being of metal and having a substantially cylindrical wall of an inside diameter larger than the outside diameter of said core, said wall being slotted longitudinally in order to be resiliently expansible in a radial direction, said sleeve member further having a flange extending substantially parallel to said plate, and a rim about said flange and extending towards said plate.

6. A device for sterilizing by heat hollow elements of syringes made from a thermoplastic material of a character assuming a plastic state at sterilizing temperatures, the device comprising a confining inner core member, a plate upon which said core member is mounted, and a confining sleeve member, surrounding the core, both said members being of a rigid shape retaining material, said core member having a cylindrical outer element contacting surface thereon, normal to said plate, the sleeve member being of metal and having a substantially cylindrical wall of an inside diameter larger than the outside diameter of said core, said wall being slotted longitudinally in order to be resiliently expansible in a radial direction, said sleeve member further having a flange extending substantially parallel to said plate, and a rim about said flange and extending towards said plate; and means for applying heat to said two members.

PAUL KOLLSMAN.

REFERENCES CITED

The following references are of record in the file of this patent:

UNITED STATES PATENTS

| Number | Name | Date |
| --- | --- | --- |
| Re. 3,531 | Hayward | July 6, 1869 |
| 763,550 | Field | June 28, 1904 |
| 1,232,573 | Lee | July 10, 1917 |
| 1,271,843 | Bradley | July 9, 1918 |
| 1,408,678 | Ayres | Mar. 7, 1922 |